Oct. 13, 1964 J. H. LADY 3,153,146

THERMAL IMAGING DEVICE USING A TARGET WHICH ROTATES THE PLANE OF POLARIZATION

Filed June 19, 1959

WITNESSES

Leon J. Jaza

James F. Young

INVENTOR

James H. Lady

BY Charles F. Renz

ATTORNEY

United States Patent Office 3,153,146
Patented Oct. 13, 1964

3,153,146

THERMAL IMAGING DEVICE USING A TARGET WHICH ROTATES THE PLANE OF POLARIZATION

James Harald Lady, Pitcairn, Monroeville, Pa., assignor to Westinghouse Electric Corporation, East Pittsburgh, Pa., a corporation of Pennsylvania Filed June 19, 1959, Ser. No. 821,567
11 Claims. (Cl. 250—83.3)

Figure 1:
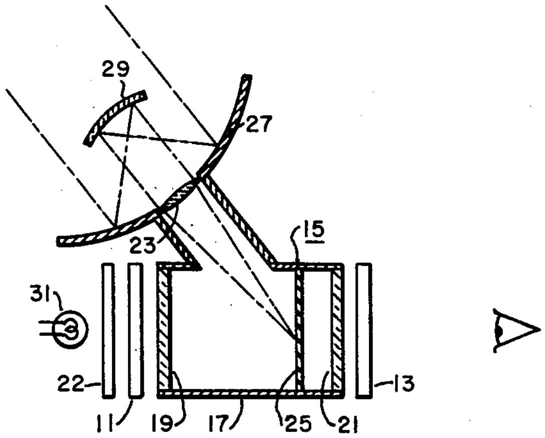

This invention relates to a thermal imaging device and more particularly to a passive infrared device that will depict an image of an infrared-emitting source.

In the field of passive thermal imaging, one of the major difficulties has been the presence of direct-current background, in addition to that of the infrared radiation. The direct-current background may be a potential, a current or a visible light intensity upon which the modulation due to the thermal image is impressed. This background will tend to saturate or decrease the sensitivity of the detector used whether it be the human eye or an electronic device, such as a vidicon. In order to eliminate the problem of background, a thermal imaging device having no or very little direct-current background has been sought.

By utilizing polarizing materials between which is positioned a thin layer of an optically active material or a material that exhibits stress birefringence, the plane of polarization of light passing through the polarizer and thin layer is altered upon the incidence of infrared radiation, thus making it possible to obtain a passive infrared imaging device having no direct-current background.

It is, accordingly, an object of this invention to provide an improved thermal detector.

Another object of this invention is to provide an improved thermal imaging device.

A further object is to provide an improved thermal imaging device having high contrast of image to background.

An additional object is to provide an improved thermal imaging device utilizing the principles of optical polarization.

An auxiliary object is to provide an improved thermal imaging device utilizing the principles of optical rotation.

A supplementary object is to provide an improved thermal imaging device utilizing the principles of both optical rotation and optical polarization.

A still further object is to provide an improved thermal imaging device utilizing materials which exhibit a strain pattern upon the incidence of infrared radiation.

These and other objects of this invention will be apparent from the following description taken in accordance with the accompanying drawing throughout which like reference characters indicate like parts, and in which:

FIGURE 1 is a cross sectional view of a thermal imaging device in accordance with this invention; and FIGS. 2 through 5 are explanatory figures to aid in the description of the operation of this device.

In FIG. 1, there is shown a polarizer 11 and an analyzer 13 which are disposed in parallel spaced relationship. The polarizer 11 and the analyzer 13 may be of tourmaline, nicol prisms or they may be of any other material which will permit light to pass in one plane only. A description of polarizing materials and the principles of operation can be found in chapter 39 of College Physics by H. A. Perkins, published in 1938 by Prentice-Hall, Inc. Positioned between the polarizer 11 and the analyzer 13 is an envelope member 15. The envelope member 15 comprises a body portion 17, a transmissive input window 19, a transmissive output window 21 and an infrared transmitting window 23. The input and output windows 19 and 21 are disposed in substantial alignment with the polarizer 11 and the analyzer 13. The input and output windows 19 and 21 are of a suitable material which is transmissive to light in the visible region of the spectrum, such as glass. Positioned within the envelope member 15 between the input and output windows 19 and 21 is a thin film 25 of an optically active material or a material exhibiting stress birefringence which is capable of rotating the plane of polarization of light, the degree of rotation depending upon the temperature change due to incident infrared radiation. The body portion 17 of the envelope member 15 is of a suitable material which is opaque to infrared radiation such as stainless steel, or a nickel, iron and cobalt alloy sold by the assignee of this application under the trademark "Kovar," or other materials utilized in the manufacture of electron tubes. If desired, the envelope member 15 may be evacuated to reduce thermal losses by conduction through the gas to the surroundings.

Means are provided for focusing an infrared thermal image onto the thin film 25. This means may comprise any of several known types of focusing apparatus, such as a Cassegrainian telescope collecting mirror 27 and a mirror 29. The mirror 29 is located with respect to the Cassegrainian telescope collecting mirror 27 so as to reflect the infrared radiation which is focused by the Cassegrainian telescope reflector 27 onto the rotating film 25.

The infrared transmitting window 23 may be of an infrared transmitting material such as sodium chloride, silver chloride or barium fluoride. The window may be positioned within the body portion 17 in the same manner as described in United States Patent No. 2,966,592, entitled "Vacuum Tight Windows," by Thomas P. Vogl et al., issued December 27, 1960, and assigned to the same assignee as the present invention. It may be desirable to provide a protective coating on the exposed surfaces of the infrared transmitting window 23 to prevent deterioration of the window due to moisture. Suitable materials for this purpose are thin layers of polyethylene and polytetrafluoroethylene. A source 31 of electromagnetic radiation is positioned so that the radiation emitted therefrom will pass consecutively through the polarizer 11, the first face portion 19, the rotating film 25, the second face portion 21 and the analyzer 13. The source 31 may be a suitable type of radiation source such as an incandescent light source, a fluorescent lamp, a series of fluorescent lamps, or an electroluminescent panel. In some instances it may be desirable to use an ultraviolet source. It may also be desirable to prevent any infrared radiation emitted by the electromagnetic radiation source 31 from reaching the rotating film 25. In this event, an optical filter 22 which transmits only the wavelengths desired may be interposed between the light source 31 and the polarizer 11.

The rotating film 25 may be fabricated from two classes of materials which rotate polarized light by different mechanisms. The first class comprises optically active materials, the optical activity of which is temperature sensitive. That is, a film of such a material will rotate plane polarized light more or less depending upon the intensity of infra-red radiation incident thereon. Materials of this class rotate polarized light because of their particular molecular structure. Discussion of optical activity may be found in Organic Chemistry Text Books such as "Organic Chemistry," by L. F. and Mary Fieser, Reinhold Publishing Corp., N.Y. (1956).

Materials of this class include both organic and inorganic substances. The organic substances include optically active forms of sugars, alkaloids and steroids. Many gluscoside polymers exhibit optical activity and are suitable for use as the rotating film 25. A suitable glucoside is alpha methyl D-glucoside.

Another organic material which may be suitable for use as film 25 is 1-propylene-oxide polymer. This polymer may be prepared by polymerizing 1-propylene-oxide in accordance with the procedure set forth in the article entitled "Polymerization of 1-Propylene-Oxide," by Charles Price et al., Journal of the American Chemical Society, volume 78, page 690.

Certain inorganic metal complex salts also exist in optically active forms. The optically active metal salts of ethylene diamine complexes generally exhibit larger optical rotation as compared with the organic materials discussed above and may be desirable for this reason. Generally, the metals that combine with ethylene diamine to form the complex salt will exhibit optical activity. Specific examples are shown by the formula:

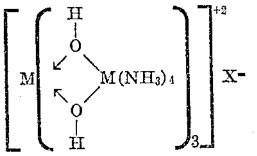

where,

M is a metal atom such as cobalt, chromium, iron, nickel and others, and,

X is a negative radical such as chlorine, bromine, iodine, sulfate, etc.

It is necessary to the operation of the infrared imaging device that the optically active material be fabricated into a film. Of course, the materials which polymerize such as 1-propylene oxide can be readily made into films. For the materials that do not polymerize, a different approach must be taken. One such approach is to dissolve a binder material, such as cellulose acetate, in a solvent, such as dioxane or any other solvent which is compatible with the optically active material. This solution is then saturated with the optically active material chosen. A strip of a film, such as nylon or polytetrafluorethylene is dipped into the solution, slowly withdrawn, and then permitted to dry either in air or an oven. Upon withdrawing the strip from the solution, a thin layer of the binder containing the optically active material adheres to the strip. After drying, this layer may be readily stripped from the base strip and mounted in the infrared device. The thickness of the binder layer containing the optically active material may be controlled by repeated dipping of the strip into the solution.

The second class of materials which may be utilized as the rotating film 25 are those exhibiting stress birefringence. That is, when such a material is under a stress, a strain pattern may be seen by viewing the material between cross polarizers such as in spectrophotoelastic tests. Material which exhibit stress birefringence include mica, glass, polymethylmethacrylate, cellophane, nylon and many other materials. It is also desirable that the material chosen to be used as the rotating film 25 have a low thermal conductivity and a high thermal coefficient of expansion.

When a thin film of a material exhibiting these properties is utilized in the device of this invention, the infrared radiation incident thereon causes localized temperature gradients which in turn causes localized areas under stress. These stressed areas are visible as a strain pattern when viewed through the analyzer 13.

In both classes mentioned above, the film 25 should exhibit the following properties; (1) a low thermal conductivity, to prevent the lateral dispersion heat, within the film; (2) the ability to absorb infrared radiation and convert it to heat; (3) large optical rotary powers; and (4) the ability to dissipate heat in a given time period. Of course, all of these properties are either directly or inversely related to the thickness of the film 25. Therefore, a compromise as to the thickness of the film must be made to achieve optimum efficiency of the device.

The ability of the film 25 to absorb infrared radiation may be increased by applying a thin infrared absorbing layer in intimate contact with the film. The infrared absorbing layer would act to convert the infrared radiation into a heat pattern which would be impressed on the film 25 by conduction.

As a specific example of the infrared imaging device as shown in FIG. 1, the radiation source 31 may be an incandescent light source, the polarizer 11 and analyzer 13 may be Nicol prisms, the body portions 17 of the envelope 15 may be stainless steel, the input window 19 and the ouput window 21 may be of glass, the infrared transmitting window 23 may be of barium fluoride, synthetic sapphire, sodium chloride, and etc., and the rotating film 25 of mica.

It may be desirable in some instances to provide an auxiliary temperature control to maintain the device at a predetermined background temperature on which temperature changes due to incident infrared indication are superimposed.

Figure 2:
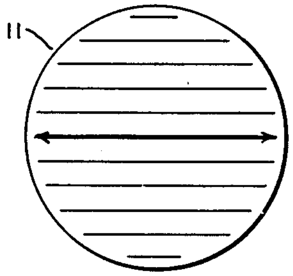
Figure 3:
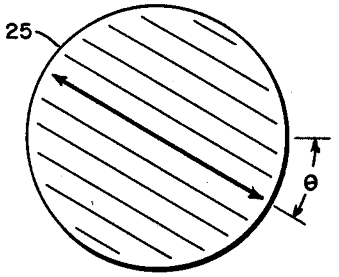

FIGS. 2 through 5 represent various stages of the direction of vibration of the light passing from the light source 31 to the analyzer 13 as would be seen from a position immediately adjacent to each member through which the light passes, and from the side from which the light exits. In the operation of the imaging device, FIG. 2 represents a view showing the direction of vibration of light waves after they have passed through the polarizer 11. The light rays are shown to be vibrating in a horizontal plane for purposes of simplicity but they may be vibrating in any plane. FIG. 3 represents a view showing the direction of vibration of the light rays after they pass through the rotating film 25. In this view, there is no infrared radiation impinging on the film 25. It can be seen that the rotating film 25 has rotated the plane of polarization of the light waves through an angle $\theta$ with respect to the original direction of vibration as shown in FIG. 2. When a stress birefringent film 25 is used, this step may or may not occur.

Figure 4:
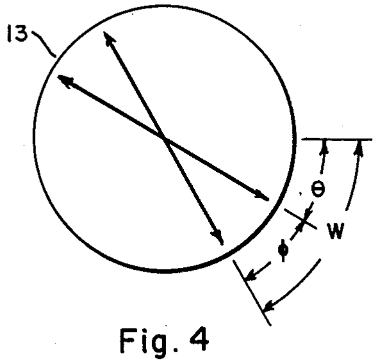

In FIG. 4, there is shown an explanatory view looking from the analyzer 13 toward the rotating film 25 when both plane polarized light from source 31 and infrared radiation collected by mirrors 27 and 29 and passed through the infrared transmitting window 23 impinge on film 25. It will be noted that the direction of vibration of the light rays has been rotated through an angle of $\phi$ with respect to the direction of the vibration of light rays when no infrared radiation was incident upon the film 25 (see FIG. 3). The direction of vibration of the light waves has now been rotated through an angle of W which is the sum of the angles $\theta$, $\phi$. In some instances, the incidence of infrared on the film 25 may cause rotation in the opposite direction. In this case the angle W would be the difference between $\theta$ and $\phi$.

Figure 5:
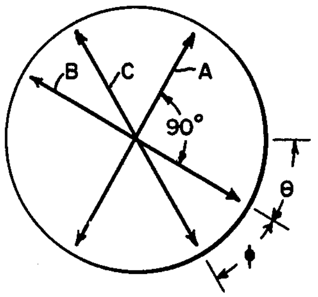

In order to achieve absolutely no direct-current background, the analyzer 13 is positioned so that its plane of polarization indicated as line A in FIG. 5 is at 90° to the direction of vibration of the light waves as shown in FIG. 3 and shown as line B in FIG. 5. That is, after the rotating film 25 is permitted to rotate without infrared excitation, the plane of polarization of the light passing through the polarizer 11, the analyzer 13 is adjusted so that no light will be transmitted through the system comprising the polarizer 11, the rotating film 25 and the analyzer 13. Subsequently, when infrared radiation is permitted to impinge on the film 25 the plane of polarization of this light after passing through film 25 will be rotated as shown by line C and permit a portion of the light to pass through the analyzer 13. This transmitted light may be viewed either directly or by an electronic pickup device such as a vidicon or orthicon. In this manner, an image of an infrared source which is caused to be incident upon the film 25 is reproduced.

It is not intended that the device as set forth in this application be limited to the use of plane polarized light only, since circular polarized light may also be applicable. That is, the polarizer 11 and the analyzer 13 may be left-handed and right-handed circular polarizers.

The device as described herein has many advantages over the prior art devices utilized as thermal imaging devices. This device is not an electronic tube and does not require the close tolerance electrodes, complicated circuits, and other inherent disadvantages of electronic tubes. Furthermore, this device permits the viewer to see only the infrared source depicted without any background.

While the present invention has been shown in one form only, it will be obvious to those skilled in the art that it is not so limited but is susceptible of various changes and modifications without departing from the spirit and scope thereof.

I claim as my invention:

1. A thermal imaging device to depict an image of an infrared-emitting source, including a polarizer and an analyzer arranged in spaced relation, a means for irradiating said polarizer with electromagnetic radiation of desired wavelength, said polarizer acting to polarize said electromagnetic radiation, means positioned between said polarizer and said analyzer for rotating the plane of polarization of radiation incident thereon, said radiation rotating means transmissive of said polarized electromagnetic radiation so that said electromagnetic radiation emerges from said radiation rotating means in a first plane of polarization, said radiation rotating means also acting to rotate said first plane of polarization to a second plane of polarization upon the incidence of infrared radiation, said analyzer being more transmissive to said electromagnetic radiation in said second plane of polarization than to said electromagnetic radiation in said first plane of polarizaton, and means forming an image of said infrared emitting source on said radiation rotating means to activate localized areas thereof in a pattern corresponding to said image whereby the plane of polarization of said electromagnetic radiation is rotated by said areas in accordance with said pattern to provide an image of said source at said analyzer.

2. A thermal imaging device to depict an image of an infrared-emitting source, including a polarizer and an analyzer arranged in spaced relation, a means for irradiating said polarizer with visible light of desired wavelength, said polarizer acting to polarize said visible light, means positioned between said polarizer and said analyzer for rotating the plane of polarization of light incident thereon, said light rotating means transmissive of said polarized visible light so that said visible light emerges from said light rotating means in a first plane of polarization, said light rotating means also acting to rotate said first plane of polarization to a second plane of polarization upon the incidence of infrared radiation, said analyzer being more transmissive to said visible light in said second plane of polarization than to said visible light in said first plane of polarization, and means forming an image of said infrared-emitting source on said light rotating means to activate localized areas thereof in a pattern corresponding to said image whereby the plane of polarization of said visible light is rotated by said areas in accordance with said pattern to provide an image of said source at said analyzer.

3. A thermal imaging device to depict an image of an infrared-emitting source, including a polarizer and an analyzer arranged in spaced relation, a means for irradiating said polarizer with electromagnetic radiation of desired wavelength, said polarizer acting to polarize said electromagnetic radiation, means positioned within an evacuated envelope between said polarizer and said analyzer for rotating the plane of polarization of radiation incident thereon, said radiation rotating means transmissive of said polarized electromagnetic radiation so that said electromagnetic radiation emerges from said radiation rotating means in a first plane of polarization, said radiation rotating means also acting to rotate said first plane of polarization to a second plane of polarization upon the incidence of infrared radiation, said analyzer being more transmissive to said electromagnetic radiation in said second plane of polarization than to said electromagnetic radiation in said first plane of polarization, and means forming an image of said infrared-emitting source on said radiation rotating means to activate localized areas thereof in a pattern corresponding to said image whereby the plane of polarization of said electromagnetic radiation is rotated by said areas in accordance with said pattern to provide an image of said source at said analyzer.

4. A thermal imaging device to depict an image of an infrared-emitting source, including a polarizer and an analyzer arranged in spaced relation, a means for irradiating said polarizer with visible light of desired wavelength, said polarizer acting to polarize said visible light, means positioned within an evacuated envelope between said polarizer and said analyzer for rotating the plane of polarization of light incident thereon, said light rotating means transmissive of said polarized visible light so that said visible light emerges from said light rotating means in a first plane of polarization, said light rotating means also acting to rotate said first plane of polarization to a second plane of polarization upon the incidence of infrared radiation, said analyzer being more transmissive to said visible light in said second plane of polarization than to said visible light in said first plane of polarization, and means forming an image of said infrared-emitting source on said light rotating means to activate localized areas thereof in a pattern corresponding to said image whereby the plane of polarization of said visible light is rotated by said areas in accordance with said pattern to provide an image of said source at said analyzer.

5. An infrared detector comprising a polarizer and an analyzer arranged parallel and in spaced relationship, a thin film of a material capable of rotating the plane of polarization of light upon the incidence of infrared radiation, said film disposed within an evacuated envelope between said polarizer and said analyzer, said evacuated envelope including a body portion and two face portions, said body portion being opaque to infrared and visible radiation, said body portion having an infrared transmitting window therein, said face portions being transparent to visible radiation, an optical system to cause said incident infrared radiation to pass through said infrared transmitting window and impinge on said thin film to activate localized areas of said thin film in accordance with the intensity of said incident infrared radiation whereby the plane of polarization of light incident thereon is rotated by said areas and a light source for the irradition of said polarizer with visible light only.

6. A thermal imaging device to depict an image of an infrared-emitting source, including a polarizer and an analyzer arranged in spaced relation, a means for irradiating said polarizer with electromagnetic radiation of desired wavelengths, said polarizer being transmissive to electromagnetic radiation in a first plane of polarization, means positioned between said polarizer and said analyzer to rotate said first plane of polarization to a second plane of polarization upon the incidence of infrared radiation from said infrared-emitting source, said analyzer being opaque to said electromagnetic radiation in said first plane of polarization but transmissive to said electromagnetic radiation in said second plane of polarization, and means forming an image of said infrared-emitting source on said radiation rotating means to activate localized areas thereof in a pattern corresponding to said image whereby the plane of polarization of said electromagnetic radiation is rotated by said areas in accordance with said pattern to provide an image of said source at said analyzer.

7. A thermal imaging device to depict an image of an infrared-emitting source, including a polarizer and an analyzer arranged in spaced relation, a means for irradiating said polarizer with electromagnetic radiation of desired wavelength, said polarizer acting to polarize said electromagnetic radiation, means positioned between said polarizer and said analyzer for rotating the plane of polarization of radiation incident thereon, said radiation rotating means being a material exhibiting optical activity, said radiation rotating means transmissive of said polarized electromagnetic radiation so that said electromagnetic radiation emerges from said radiation rotating means material in a first plane of polarization, said radiation rotating means also acting to rotate said first plane of polarization to a second plane of polarization upon the incidence of infrared radiation, said analyzer being more transmissive to said electromagnetic radiation in said second plane of polarization than to said electromagnetic radiation in said first plane of polarization, and means forming an image of said infrared-emitting source on said radiation rotating means to activate localized areas thereof in a pattern corresponding to said image whereby the plane of polarization of said electromagnetic radiation is rotated by said areas in accordance with said pattern to provide an image of said source at said analyzer.

8. A thermal imaging device to depict an image of an infrared-emitting source, including a polarizer and an analyzer arranged in spaced relation, a means for irradiating said polarizer with electromagnetic radiation of desired wavelength, said polarizer acting to polarize said electromagnetic radiation, means positioned between said polarizer and said analyzer for rotating the plane of polarization of radiation incident thereon, said radiation rotating means being a material exhibiting stress birefringence, said radiation rotating means transmissive of said polarized electromagnetic radiation so that said electromagnetic radiation emerges from said radiation rotating means material in a first plane of polarization, said radiation rotating means also acting to rotate said first plane of polarization to a second plane of polarization upon the incidence of infrared radiation, said analyzer being more transmissive to said electromagnetic radiation in said second plane of polarization than to said electromagnetic radiation in said first plane of polarization, and means forming an image of said infrared-emitting source on said radiation rotating means to activate localized areas thereof in a pattern corresponding to said image whereby the plane of polarization of said electromagnetic radiation is rotated by said areas in accordance with said pattern to provide an image of said source at said analyzer.

9. A thermal imaging device comprising a target exposed to an infrared image from an object to be viewed, and means to irradiate said target with polarized radiation, said target including a material having the property of rotating the angle of the polarization vector of said polarized radiation in accordance with a temperature change in said material produced by infrared radiation incident on said target.

10. A thermal imaging device comprising an infrared absorbing target, means to focus an infrared image from an object to be viewed on to said target, and means to irradiate said target, simultaneously with said infrared image, with visible polarized radiation having uniform polarization on all elemental areas of said target, said target including a thermally sensitive film of material having the property of rotating the angle of the polarization vector of the incident visible polarized light in accordance with temperature changes in elemental areas of said film produced by infrared radiation incident on said target.

11. A thermal imaging device comprising an infrared absorbing target, means to focus an infrared image from an object to be viewed on to said target, means to irradiate said target, simultaneously with said infrared image, with visible polarized radiation having uniform polarization on all elemental areas of said target, said target including a thermally sensitive film of material having the property of rotating the angle of the polarization vector of incident visible polarized light in accordance with temperature changes in elemental areas of said film produced by infrared radiation incident on said target, and an analyzer exposed to said target, said analyzer disposed to transmit radiation having a polarization vector at an angle substantially differing from that of radiation transmitted by said target without infrared radiation incident thereon.

References Cited in the file of this patent

UNITED STATES PATENTS

| | | |
|---|---|---|
| 1,642,011 | Chubb | Sept. 13, 1927 |
| 2,123,743 | Pratt | July 12, 1938 |
| 2,152,202 | Miller | Mar. 28, 1939 |
| 2,418,964 | Arenberg | Apr. 15, 1947 |
| 2,442,396 | Bubb et al. | June 1, 1948 |
| 2,768,557 | Bond | Oct. 30, 1956 |
| 2,824,235 | Hahn et al. | Feb. 18, 1958 |
| 2,879,424 | Garbung | Mar. 24, 1959 |
| 2,974,568 | Dillon | Mar. 14, 1961 |
| 3,015,693 | Volberg et al. | Jan. 2, 1962 |